Jan. 29, 1963  G. H. DABRINGHAUS  3,075,415
MACHINE FOR DEEP DRILLING
Filed May 4, 1959  2 Sheets-Sheet 1
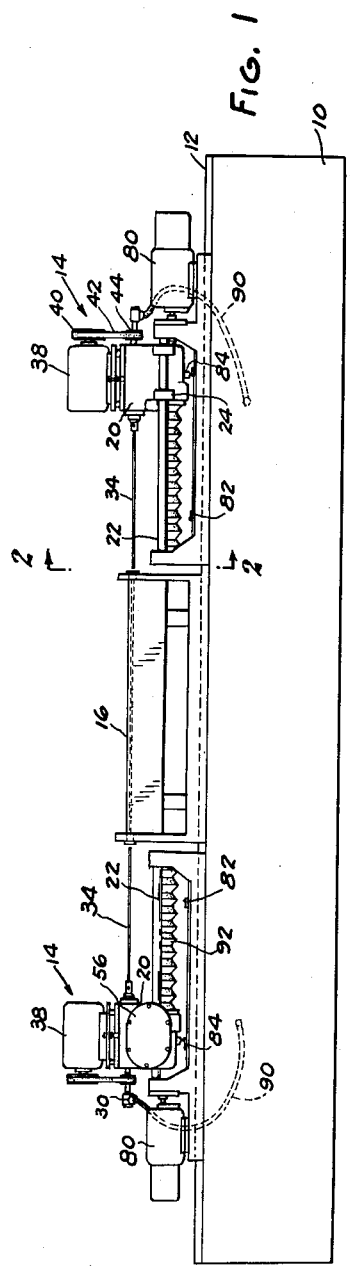
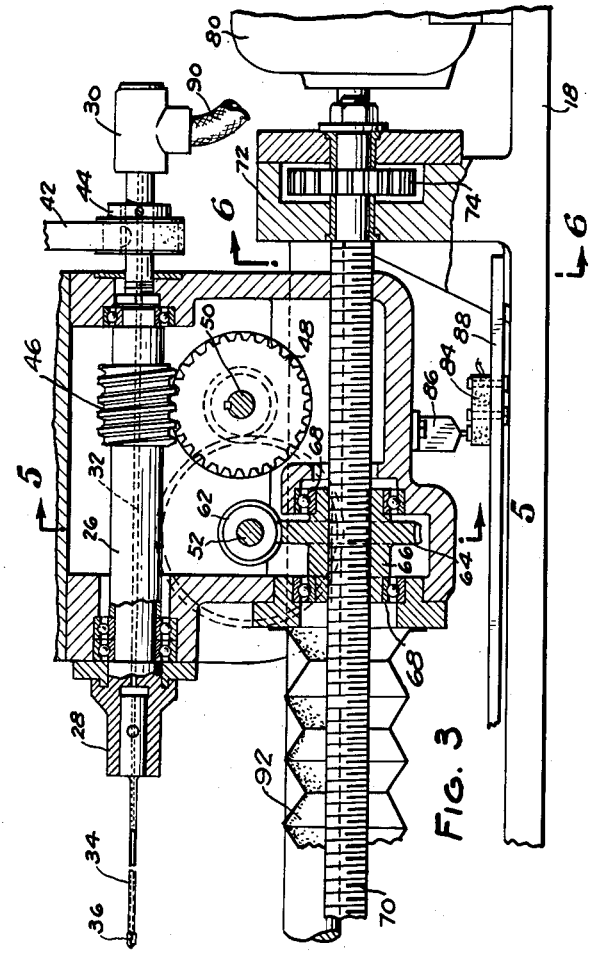
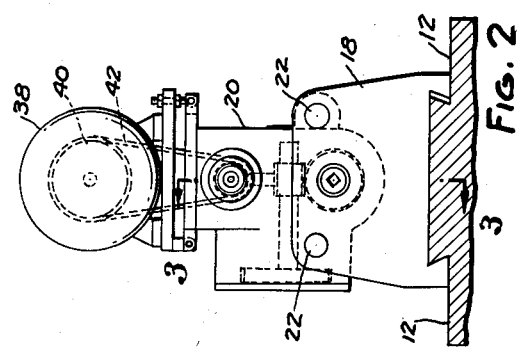
INVENTOR.
GUSTAV H. DABRINGHAUS
BY
*Barnes, Kisselle, Raisch & Choate*
ATTORNEYS Jan. 29, 1963   G. H. DABRINGHAUS   3,075,415
MACHINE FOR DEEP DRILLING
Filed May 4, 1959   2 Sheets-Sheet 2
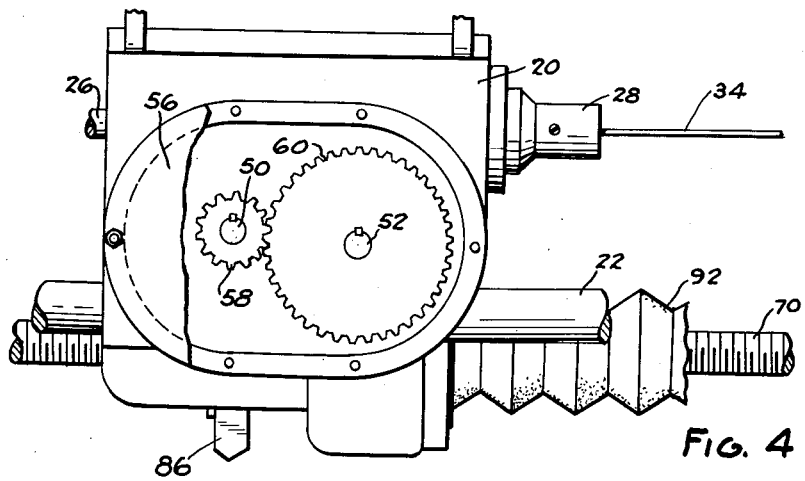
FIG. 4
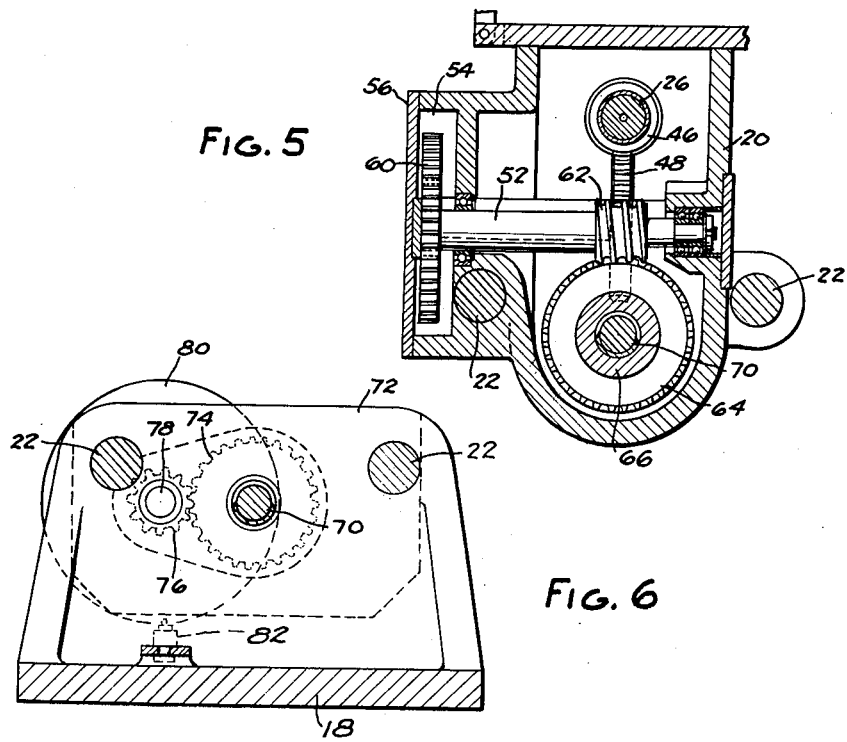
FIG. 5
FIG. 6
INVENTOR.
GUSTAV H. DABRINGHAUS
BY
Barnes, Kisselle, Raisch & Choate
ATTORNEYS

United States Patent Office 3,075,415
Patented Jan. 29, 1963

3,075,415
MACHINE FOR DEEP DRILLING
Gustav H. Dabringhaus, 6070 E. Eighteen Mile Road,
Utica, Mich.
Filed May 4, 1959, Ser. No. 810,685
9 Claims. (Cl. 77—34.7)

This invention relates to an electro-mechanical machine for deep drilling and more specifically to a deep drilling machine of the type commonly referred to as a gun drilling machine.

Generally speaking, there are two types of deep drilling machines; those of the gun drilling type and those of the step drilling type. In step drilling machines, the drill is advanced a predetermined depth and then retracted to clear the chips from the hole being drilled. With machines of this type, it is impossible to obtain close tolerances on the diameter of the hole and also a very smooth finish because of the necessity of repeatedly retracting the drill from the hole being drilled.

In operation, gun drilling machines are altogether different from step drilling machines. In a gun drilling machine, the drill is advanced continuously and the chips are removed by directing a liquid lubricant under pressure down to the tip of the drill and causing this lubricant to flow out of the hole around the shank of the drill and carry the chips with it. Thus, with gun drilling machines, the particular type or form of chip produced by the drill is very important. If an improper chip is formed, it is impossible to flush the chip out of the hole being drilled by means of lubricant.

I have found that in general, gun drilling of metals requires a relatively high speed of the drill with a relatively low feed. In this connection, I have also determined that the relation between speed and feed is very critical; and in order to obtain satisfactory results, this relationship varies considerably depending upon the type of metal and the size of the hole being drilled. For example, in drilling a hole having a diameter of about 3/16" and a depth of about 20" in steel heat treated to a hardness of 40 Rockwell C, I have found that best results are obtained where the drill spindle of the machine is rotated at a speed of about 5000 r.p.m. and the drill is advanced about .0002" per revolution. On the other hand, if a 1/2" hole were drilled in the same steel, then best results would be obtained with a speed of the spindle at about 1800 r.p.m. and with a feed of about .0005". In drilling a 1/2" hole, say 20" deep, in a material such as Inconel-X, best results are obtained with a spindle speed of 1200 r.p.m. and a feed of about .0003". If the same size hole is to be drilled in aluminum, then the speed of the spindle should be increased to about 5000 r.p.m. and the feed increased to about .0007". However, if a 1/4" hole about 20" deep is to be drilled in aluminum, then very good results are obtained when the spindle speed is about 10,000 to 12,000 r.p.m. and the feed is about .0005". In the latter case, to obtain a finer finish and a straighter hole, the speed should be reduced to about 6,000 r.p.m. and the feed to about .0003" per revolution.

It is apparent, therefore, that a deep drilling machine of the gun drilling type must be capable of producing an extremely slow feed in relation to the speed of the spindle and at the same time, must be capable of producing minute changes in feed in order to obtain best results on all types of material. Experience has shown that a slight change in feed per revolution of the spindle very often produces a substantial change in the amount of drift, the finish obtained, the variation in diameter and the form of chip formed. Deep drilling machines of the continuous feed type must therefore be capable of rotating the spindle at a very high speed and at the same time produce a very slow feed in order to produce best results. The machine must furthermore be capable of changing the spindle feed in very minute increments. The machine of this invention possesses these features.

In the drawings:
FIG. 1 is a side elevational view of a deep drilling machine according to the present invention.
FIG. 2 is a sectional view taken along the line 2—2 in FIG. 1.
FIG. 3 is a fragmentary sectional view through one of the heads of the machine taken along the line 3—3 in FIG. 2.
FIG. 4 is a fragmentary side elevational view of a portion of the machine illustrated in FIG. 1.
FIG. 5 is a sectional view taken along the line 5—5 in FIG. 3.
FIG. 6 is a sectional view taken along the line 6—6 in FIG. 3.

The machine illustrated in FIG. 1 generally comprises a base 10 provided with parallel ways 12 on which two drilling units of the present invention generally designated 14 are mounted in opposed relation. The drilling units 14 are adjustable longitudinally of the ways 12 to accommodate therebetween a work piece 16 to be drilled. Each drilling unit 14 includes a base member 18 engaged with the ways 12. A drilling head 20 is mounted on each base 18 for movement longitudinally thereof by means of a pair of spaced parallel guide rods 22. Head 20 is mounted on the guide rods 22 by means of low friction bearings in bosses 24 on the head 20. Within head 20, there is journalled a spindle 26. A collet 28 is mounted on one end of spindle 26 and a liquid coupling 30 is mounted on the other end of spindle 26. Spindle 26 is provided with an axial bore 32 for conducting liquid lubricant such as oil under relatively high pressure from the coupling 30 to the hollow drill 34 retained in collet 28. Drill 34 is of the conventional deep drilling type having an axial bore as illustrated and a carbide tip 36. The working end of the drill is apertured so that a stream of lubricant under relatively high pressure is directed to the point of drilling; and by means of this stream of lubricant, the chips cut by the carbide tip 36 are flushed out of the hole being drilled.

On the top of each head 20, there is mounted a high speed electric motor 38, the shaft of which is provided with a sheave 40. Motor 38 drives spindle 26 directly through a belt 42 and a sheave 44 removably mounted on the spindle. The speed of spindle 26 in relation to the speed of motor 38 can be readily varied by changing the relative sizes of sheaves 40 and 44. Motor 38 is of a conventional type which incorporates an electric brake that is automatically applied whenever the motor is deenergized. The brake is deenergized as soon as the motor is energized.

Within head 20, there is keyed to spindle 26 a worm gear 46 which meshes with a worm wheel 48. Worm wheel 48 is keyed to a shaft 50 journalled in head 20 perpendicularly to spindle 26. A second shaft 52 is also journalled in head 20 in parallel relation to shaft 50. At one side thereof, head 20 is provided with a gear box 54 closed by a removable cover plate 56 (FIG. 5). Shafts 50 and 52 project at one end into gear box 54. Pick-off gears 58 and 60 are keyed to the ends of shafts 50 and 52, respectively, within gear box 54. Gears 58 and 60 are in meshing relation and the relative speeds of the two shafts 50 and 52 can be readily changed by simply removing cover plate 56 and replacing the two gears 58 and 60 with another set of pick-off gears of different relative sizes.

Within head 20, there is keyed to shaft 52 a second worm 62 which meshes with a worm wheel 64 formed integrally with a nut 66. Nut 66 is journalled for rotation in head 20 by bearings 68. Nut 66 is threadedly engaged with an axially extending lead screw 70 journalled for rotation on base 18 in upright standards 72 adjacent opposite ends of base 18. At its outer or rear end, each lead screw 70 has keyed thereto a spur gear 74 which meshes with another spur gear 76 (FIG. 6) keyed to the drive shaft 78 of a rapid traverse electric motor 80. Motor 80, like motor 38, includes a brake, not illustrated, which restrains the motor shaft 78 from rotating when the motor 80 is deenergized. When the motor 80 is energized, the brake is released to permit rotation of the shaft 78.

It is desirable to provide suitable limit switches 82 and 84 on base 18 which are adapted to be actuated by a detent 86 on head 20. Limit switches 82 and 84 are mounted for adjustment axially of base 18 on an axially extending rail 88. The limit switch arrangement is such that when limit switch 82 is contacted by the advancing detent 86, motor 38 is deenergized and motor 80 is energized. On the retraction of head 20, when detent 86 strikes limit switch 84, motor 80 is deenergized. A suitable control panel including start and stop switches, not illustrated, is incorporated in the machine for controling the operation thereof.

The arrangement illustrated in FIG. 1 shows a set-up for drilling a small hole horizontally through the work piece 16. The two drills 34 are axially aligned and the work piece 16 is fixtured on the base 10 of the machine so that the ends of the drills 34 are aligned axially with the axis of the hole to be drilled. In this arrangement, both heads 20 are advanced axially toward one another. The limit switches 82, 84 for the two heads are adjusted such that one of the heads will advance its associated drill about half-way through the work and then retract and the other head will advance a slightly greater distance so as to connect the two holes drilled and thereby form one continuous hole completely through the work piece, the hole having a perfectly straight axis. Both heads 20 operate in exactly the same manner and a description of the operation of only one of the heads is therefore necessary.

When the start switch of the machine is actuated, motor 38 is energized. This causes spindle 26 to be rotated at a speed relative to the speed of motor 38 as determined by the size ratio between sheaves 40 and 44. The ratio between sheaves 40 and 44 will be selected in accordance with the spindle speed desired as determined by the material being drilled and the size of the hole being drilled. Rotation of spindle 26 is transmitted to shaft 50 through worm gear 46 and worm wheel 48 and in turn, shaft 52 is rotated by reason of the interengagement of the pick-off gears 58 and 60. Thus, worm 62 is rotated at a predetermined speed in relation to the speed of motor 38 and rotation is thereby imparted to the nut 66 by the worm wheel 64. Lead screw 70 at this time is prevented from rotating by reason of its interconnection with the shaft 78 of motor 80. Thus, as the nut 66 is rotated, it is advanced along screw 70 toward the work piece. Just before the tip 36 of the drill contacts the work piece, an oil pump, not illustrated, is energized to conduct oil under pressure through a conduit 90 and to the fitting 30 at the rear or outer end of spindle 26. This oil under pressure flows through the hollow spindle 26 through the collet 28 and through the drill 34 to the end thereof adjacent the carbide cutting tip 36. As the tip 36 cuts into the work being drilled, the chips formed thereby are flushed out of the hole by the oil discharged from the end of the drill. Each head 20 thereby advances along the lead screws 70 on the guide bars 22 until the detent 86 contacts the limit switch 82. When the limit switches 82 are actuated, motors 38 are deenergized and motors 80 are energized. Thus, the nut 66 is held stationary and the lead screw 70 is rotated at a speed determined by the speed of motor 80 and the size ratio of bears 75 and 76. It will be apparent, however, that the motor 80 produces a rapid traverse of head 20 on the retraction stroke of the heads as compared to the extremely slow rate of advance of the heads 20 during the feed cycle. In order to protect the screws 70 from the chips flushed out of the hole being drilled, a portion of each screw 70 between the head 20 and the upright standard 72 at the inner end of base 18 is enclosed by a bellows member 92.

With the arrangement described herein, it will be observed that spindle 26 can be rotated at a relatively high speed, 10,000 r.p.m., for example, while the head 20 is advanced at an extremely slow feed rate, .0001" per revolution of spindle 26, for example. The extremely slow feed rate possible with this arrangement in relation to the speed of spindle 26 is achieved by the particular gearing employed. As described, this gearing consists of two worm drives and a single set of pick-off gears. One worm drive, that is, the worm 46 and the worm wheel 48, is directly from the spindle 26 and the other worm drive, that is, worm 62 and the worm wheel 64, is on the nut 66. Between these two worm drives is interposed the set of pick-off gears 58 and 60.

This simple arrangement not only enables me to reduce the speed of rotation of nut 66 to an extremely low value in relation to speed of motor 38, but also enables me to vary the speed of nut 66 by very small increments.

An example of the gear reduction possible with this arrangement will illustrate clearly the slow feed rate obtainable. Assume a gear reduction of 25 to 1 at both worm drives, a 2 to 1 ratio at the pick-off gears 58, 60 and a lead screw 70 having a pitch of 8 threads per inch. With such an arrangement if the spindle is rotated at 10,000 r.p.m. shaft 50 will rotate at 400 r.p.m. and shaft 52 at 200 r.p.m. Nut 66 will rotate at 8 r.p.m. and for each revolution of spindle 26 the head 20 will advance .0001". By providing a plurality of sets of pick-off gear which progressively change the gear ratio by one tooth, a progressive variation in the feed in increments of .000015" is obtainable.

Thus, with this arrangement, I am able to accommodate the speed and feed of the spindle to any particular requirements of deep drilling, considering the type of material and the size of the hole being drilled. When one considers that the proper chip formation is under many circumstances controlled by a very critical relationship between the speed of the spindle and the feed thereof and that a very slight change in this ratio produces a substantial change in the type of chip formed, the desirability of the particular arrangement shown herein can be readily appreciated. The two sets of worm drives provide a maximum speed reduction with the least possible gearing. The worm drives are capable of transmitting high torque at very high speeds. In addition, this particular arrangement reduces the noise and backlash to a minimum.

It should also be noted that the feed of the spindle is at all times synchronized with its speed. If the pick-off gears are selected to provide a feed of .0001" per revolution of the spindle, this ratio of speed to feed will remain the same regardless of any change in speed of the spindle. This feature of my machine is also important since as pointed out previously the axial feed of the spindle in relation to its speed is very critical in many instances.

I claim:
1. In a deep drilling machine of the continuous feed type wherein the spindle is adapted to have a speed as high as about 10,000 r.p.m. and a feed as low as .0001" per revolution of the spindle, the combination of a head, a hollow spindle journalled on said head and having collet means thereon for supporting a hollow drill, means for admitting liquid lubricant to the hollow spindle and through the spindle to the drill thereon, a motor for driving the spindle at a relatively high speed and means for advancing said head and spindle in a direction axially of the spindle at a relatively slow feed rate which can be varied by minute increments comprising a screw member and a nut member, one of which is axially and rotatably fixed and the other being rotatable on the head and mov- able axially on the other with said head, a worm on said spindle, a pair of parallel shafts journalled on said head, one of said shafts having a worm wheel fixed thereon and meshing with said worm gear, the other shaft having a worm gear thereon, one of said screw and nut members having a worm wheel fixed thereto and meshing with said last mentioned worm gear and a pair of meshing pick-off gears keyed to said shafts for ready removal therefrom.

2. The combination set forth in claim 1 wherein the screw member is fixed and the nut member is rotatable on the screw member and carries the last mentioned worm wheel.

3. The combination set forth in claim 2 including means for optionally rotating said screw at a relatively fast rate as compared with the rate of rotation of the nut through the aforementioned gear train from said motor.

4. In a deep drilling machine of the continuous feed type wherein the spindle is adapted to have a speed as high as about 10,000 r.p.m. and a feed as low as .0001″ per revolution of the spindle, the combination of a base, axially extending guide means on said base, a head on said base engaged with said guide means for movement axially therealong, said head comprising a housing, a spindle journalled in said housing and having opposite end portions thereof projecting outwardly of the housing, said spindle being hollow and having collet means at one end thereof for supporting a hollow drill, the opposite end portion of the spindle having means thereon for conducting liquid lubricant through the spindle and collet means to the hollow drill, a motor for driving the spindle at a relatively high speed and means for advancing the head and spindle axially along said guide means at a relatively slow rate of feed which can be varied by minute increments comprising a screw, means on said base for supporting said screw in axially fixed position and for preventing rotation of the screw, a nut journalled on said head and threaded on said screw such that when the nut is rotated, the head is shifted axially of said guide means, a worm on said spindle, a pair of parallel shafts journalled on said head, one of said shafts having a worm wheel fixed thereon and meshing with said worm gear, the other shaft having a worm gear thereon, said nut having a worm wheel thereon meshing with the last mentioned worm gear and a pair of meshing pick-off gears keyed to said shaft for ready removal therefrom.

5. The combination set forth in claim 4 wherein said housing includes a gear box, said gear box being closed at one side of said housing by a removable cover plate, said shafts projecting into said gear box, said pick-off gears being mounted on the portions of the shafts projecting into the gear box.

6. The combination set forth in claim 4 including a motor having a normally non-rotatable shaft which is driven when the motor is energized and means operably connecting said motor shaft with said screw.

7. In a deep drilling machine of the continuous feed type wherein the spindle is adapted to have a speed as high as about 10,000 r.p.m. and a feed as low as .0001″ per revolution of the spindle, the combination of a base, axially extending guide means on said base, a head on said base engaged with said guide means for movement axially therealong, said head comprising a housing, a spindle journalled in said housing and having opposite end portions thereof projecting outwardly of the housing, said spindle being hollow and having collet means at one end thereof for supporting a hollow drill, the opposite end portion of the spindle having means thereon for conducting liquid lubricant through the spindle and collet means to the hollow drill, a motor for driving the spindle at a relatively high speed and means for advancing the head and spindle axially along said guide means at a relatively slow rate of feed which can be varied by minute increments comprising a screw, means on said base for supporting said screw in axially fixed position and for preventing rotation of the screw, a nut journalled on said head and threaded on said screw such that when the nut is rotated, the head is shifted axially of said guide means, a worm on said spindle, a pair of parallel shafts journalled on said head, one of said shafts having a worm wheel fixed thereon and meshing with said worm gear, the other shaft having a worm gear thereon, said nut having a worm wheel thereon meshing with the last mentioned worm gear and a pair of meshing pick-off gears keyed to said shaft for ready removal therefrom, said motor including a driven shaft, a sheave removably mounted on said shaft, one end portion of said spindle projecting out of said housing having a sheave thereon, said last mentioned sheave being readily removable from the spindle and a belt extending around and operably connecting said sheaves.

8. The combination set forth in claim 7 wherein said motor shaft is non-rotatable when the motor is deenergized.

9. In a deep drilling machine of the continuous feed type wherein the spindle is adapted to have a speed as high as about 10,000 r.p.m. and a feed as low as .0001″ per revolution of the spindle, the combination of a head, a hollow spindle journalled on said head and having collet means thereon for supporting a hollow drill, means for admitting liquid lubricant to the hollow spindle and through the spindle to the drill thereon, a motor for driving the spindle at a relatively high speed and means for advancing said head and spindle in a direction axially of the spindle at a relatively slow feed rate which can be varied by minute increments comprising a screw member and a nut member, one of which is axially and rotatably fixed and the other being rotatable on the head and movable axially on the other with said head, a worm on said spindle, a pair of parallel shafts journalled on said head, one of said shafts having a worm wheel fixed thereon and meshing with said worm gear, the other shaft having a worm gear thereon, one of said screw and nut members having a worm wheel fixed thereto and meshing with said last mentioned worm gear and a pair of meshing pick-off gears keyed to said shafts for ready removal therefrom, the drive between the motor and the spindle comprising a sheave removably mounted on the motor shaft, a sheave removably mounted on the spindle and a belt extending around and operably connecting said sheaves.

References Cited in the file of this patent
UNITED STATES PATENTS

| | | |
|---|---|---|
| 447,713 | Sponsel | Mar. 3, 1891 |
| 578,431 | Tucker | Mar. 9, 1897 |
| 2,054,760 | Oberhoffken | Sept. 15, 1936 |
| 2,630,724 | Saives | Mar. 10, 1953 |